US006427427B1

(12) United States Patent
Dietz

(10) Patent No.: US 6,427,427 B1
(45) Date of Patent: Aug. 6, 2002

(54) OIL DRAIN AND SIGHT GAUGE FOR INTERNAL COMBUSTION ENGINE

(75) Inventor: James R. Dietz, New Holstein, WI (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/583,615

(22) Filed: May 31, 2000

(51) Int. Cl.[7] ............ A01D 34/00
(52) U.S. Cl. ............ 56/1; 56/16.7
(58) Field of Search ............ 123/196 R, 196 CP; 137/558; 73/316; 56/1, 16.7; 184/1.5

(56) References Cited

U.S. PATENT DOCUMENTS

| | | | | | |
|---|---|---|---|---|---|
| 1,140,080 | A | | 5/1915 | Speer | |
| 1,163,919 | A | | 12/1915 | Herb et al. | |
| 1,210,385 | A | | 12/1916 | Hunziker | |
| 1,275,935 | A | | 8/1918 | Jones | |
| 1,386,903 | A | | 8/1921 | Short | |
| 1,509,023 | A | | 9/1924 | Page | |
| 1,600,227 | A | | 9/1926 | Haskell et al. | |
| 1,613,312 | A | | 1/1927 | Couts | |
| 1,717,188 | A | * | 6/1929 | Ciomei | 33/370 |
| 1,778,840 | A | | 10/1930 | Wale | |
| 1,786,750 | A | | 12/1930 | Hasselquist et al. | |
| 1,856,826 | A | | 5/1932 | Bennett | |
| 2,095,696 | A | | 10/1937 | Hackel | 137/34 |
| 2,304,644 | A | | 12/1942 | Heftler | 184/55 |
| 2,877,867 | A | | 3/1959 | Cain et al. | 184/1.5 |
| 3,103,816 | A | | 9/1963 | Kawecki | 73/323 |
| 3,181,362 | A | | 5/1965 | McKenney | 73/303 |
| 3,181,745 | A | * | 5/1965 | Grobowski | 222/539 |
| 3,453,886 | A | | 7/1969 | Avrea | 73/323 |
| 3,871,483 | A | | 3/1975 | Espinosa et al. | 184/1.5 |
| 3,983,958 | A | | 10/1976 | Swearingen | 184/28 |
| 4,086,981 | A | | 5/1978 | Mitsui | 184/1.5 |
| 4,133,287 | A | | 1/1979 | Downs | 116/227 |
| 4,403,466 | A | | 9/1983 | Tillotson et al. | 56/16.7 |
| 4,449,692 | A | | 5/1984 | Rhodes | 251/144 |
| 4,676,205 | A | * | 6/1987 | Kaufman | 12/195 R |
| 4,903,654 | A | * | 2/1990 | Sato et al. | 123/196 W |
| 5,025,764 | A | | 6/1991 | Kobayashi et al. | 123/198 R |
| 5,199,914 | A | | 4/1993 | Marsh | 440/88 |
| 5,259,588 | A | | 11/1993 | Crosby, Jr. et al. | 251/100 |
| 5,295,359 | A | * | 3/1994 | Reilly, Jr. et al. | 62/125 |
| 5,299,777 | A | | 4/1994 | Milstead | 251/144 |
| 5,386,881 | A | | 2/1995 | Eshelman | 184/1.5 |
| 5,407,177 | A | | 4/1995 | Lombardo | 251/315.14 |
| 6,223,713 | B1 | * | 5/2001 | Moorman et al. | 123/196 R |

* cited by examiner

*Primary Examiner*—Thomas B. Will
*Assistant Examiner*—Meredith C. Petravick
(74) *Attorney, Agent, or Firm*—Baker & Daniels

(57) ABSTRACT

An oil drain valve and oil sight gauge assembly for an internal combustion engine of an implement such as a lawnmower. The oil drain valve includes a valve member disposed in a valve body attached to the engine housing and disposed above the mower deck. The valve member may be selectively moved to allow oil to drain from an oil sump in the engine crankcase through a drain opening disposed below the mower deck. The valve member is retained in the valve body when the oil drain valve is opened to prevent the valve member from being lost. The oil sight gauge is internally vented to the crankcase to provide an accurate indication of the oil level in the crankcase, and is visually associated with the oil drain valve to provide an operator with a visual confirmation that all of the oil has been drained from the crankcase.

19 Claims, 4 Drawing Sheets

OIL DRAIN AND SIGHT GAUGE FOR INTERNAL COMBUSTION ENGINE

BACKGROUND OF THE INVENTION

1. Field of the Invention

The present invention relates to an oil drain and sight gauge assembly for small engines used with lawnmowers and other implements having a deck to which an engine is mounted. More particularly, the present invention provides an oil drain valve which allows an operator to easily drain oil from the crankcase of the engine without tipping the engine, and an oil sight gauge visually associated with the oil drain valve and vented to the crankcase to provide an accurate indication of the oil level in the crankcase and to allow an operator to confirm that all of the oil has been drained from the crankcase.

2. Description of the Related Art

Lubricating oil, used to lubricate small engines such as those used with lawnmowers, is carried in an oil sump in the crankcase and moved by splashing, by pulsating pressure from a reciprocating piston or by a pump, for example, to various locations throughout the engine to lubricate the moving parts of the engine. The oil requires changing periodically, which involves draining the oil from the oil sump in the crankcase, and then filling the oil sump with new oil through an oil fill.

Previous engines have included an oil drain plug threaded in a small drain hole which is located on the side of the crankcase. The drain plug may be removed from the drain hole using hand tools to allow oil to drain out of the crankcase through the drain hole.

A problem with these designs is that, because the oil drain plug is located on the side of the crankcase, it is necessary to tip the entire lawnmower during oil draining to ensure that all of the oil is drained from the crankcase, which is a difficult and awkward procedure. Tipping the lawnmower becomes even more difficult as the size and weight of the lawnmower and engine are increased.

A further problem with these designs is that the plug is completely removed from the oil drain hole, and therefore may be lost or misplaced by the user.

What is needed is an oil drain valve which is easily accessible and may be operated by hand to drain oil from the bottom of the crankcase such that tipping of the entire engine is not needed to ensure that all of the oil is drained from the crankcase, and a device which may be used by an operator in combination with the oil drain valve to provide an accurate indication of the oil level in the crankcase and a visual confirmation that all of the oil has been drained from the crankcase.

SUMMARY OF THE INVENTION

The present invention is an oil drain valve and oil sight gauge assembly for a lawnmower or other implement, the oil drain valve including a manually operable valve member disposed in a valve body located above the mower deck which may be selectively moved to allow oil to drain from the crankcase through a drain opening located beneath the mower deck. The oil sight gauge is internally vented to the crankcase to provide an accurate indication of the oil level in the crankcase, and provides the operator with a visual confirmation that all of the oil has been drained from the crankcase.

The valve member is disposed in a bore in the valve body in communication with the oil sump. The valve member includes a control element which may be operated by hand to move the valve member between a first position in which the valve member blocks the oil drain opening and a second position in which oil may drain from the oil sump through the valve body and out through the drain opening located beneath the mower deck. The valve member is retained in the valve body to prevent the valve member from being lost.

The oil sight gauge is mounted to the mounting flange in communication with the oil sump, and is visually associated with the oil drain valve. The oil sight gauge may include a transparent oil sight tube with at least one marking thereon, the oil sight tube also having an indicator element disposed therein which floats on the oil in the oil sight tube and cooperates with the marking to visually indicate the oil level in the crankcase.

Alternatively, rather than an oil sight gauge, a sight glass or sight crystal may be mounted in the wall of the mounting flange of the crankcase, in communication with the oil in the crankcase, to indicate whether oil is present in the crankcase.

In one form thereof, a lawnmower is provided, including a deck enclosing a blade; an internal combustion engine attached to the deck, the engine having a crankcase, an oil sump disposed in a lower portion of the crankcase, and a crankshaft drivably connected to the blade; an oil drain valve mounted to the crankcase, including a valve body, an oil drain opening in communication with the oil sump and disposed below the deck, and a valve member disposed in the valve body and having a manually operable control element disposed above the deck, the valve member movable between a first position in which the valve member blocks the oil drain opening and a second position in which oil may drain from the oil sump through the oil drain opening; and an oil sight gauge mounted to the crankcase, the oil sight gauge in fluid communication with the oil sump.

In another form thereof, a lawnmower is provided, having a deck enclosing a blade and an engine mounted to the deck, the engine having a crankcase with an oil sump disposed in a lower portion thereof and a crankshaft drivably connected to the blade, and the combination of an oil drain valve mounted to the crankcase in fluid communication with the oil sump, the oil drain valve having a valve body, an oil drain opening disposed below the deck, and a valve member disposed in the valve body and having a manually operable control element disposed above the deck, the valve member selectively moveable between a first position in which the valve member blocks the oil drain opening and a second position in which oil may drain from the oil sump through the oil drain opening; and an oil sight gauge mounted to the crankcase in fluid communication with the oil sump.

In a further form thereof, a lawnmower is provided, including a deck enclosing a blade; a housing including a crankcase with a mounting flange, the mounting flange attached to the deck; an internal combustion engine disposed in the housing; a crankshaft driven by the engine, the crankshaft extending externally of the housing and drivably attached to the blade; an oil sump carried in the mounting flange; an oil sight gauge mounted to the mounting flange and having a lower portion in fluid communication with the oil sump and an upper portion in venting communication with the crankcase; an oil drain valve in communication with the oil sump and mounted to the mounting flange, the oil drain valve including a valve body integral with the mounting flange, a drain slot disposed below the deck, and a valve member disposed in the valve body and having a manually operable control element disposed above the deck, the valve member movable between a first position in which the valve member blocks the drain slot and a second position in which the valve member is moved away from the drain slot to allow oil to drain from the oil sump through the drain slot; and the oil drain valve and the oil sight gauge visually associated with one another.

The advantage of this arrangement is that the oil drain valve is easily accessible, may be operated by hand, and allows oil to be drained from the bottom of the oil sump in the crankcase such that tipping the engine is not necessary to drain all of the oil from the crankcase. Because the drain opening is located below the mower deck and is therefore not visible to the operator, the oil sight gauge provides the operator with a visual confirmation that all the oil has been drained from the crankcase.

Another advantage of this arrangement is that the valve element is retained within the mounting flange when the oil drain valve is opened to prevent the stopcock from being lost.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION

Figure 1:
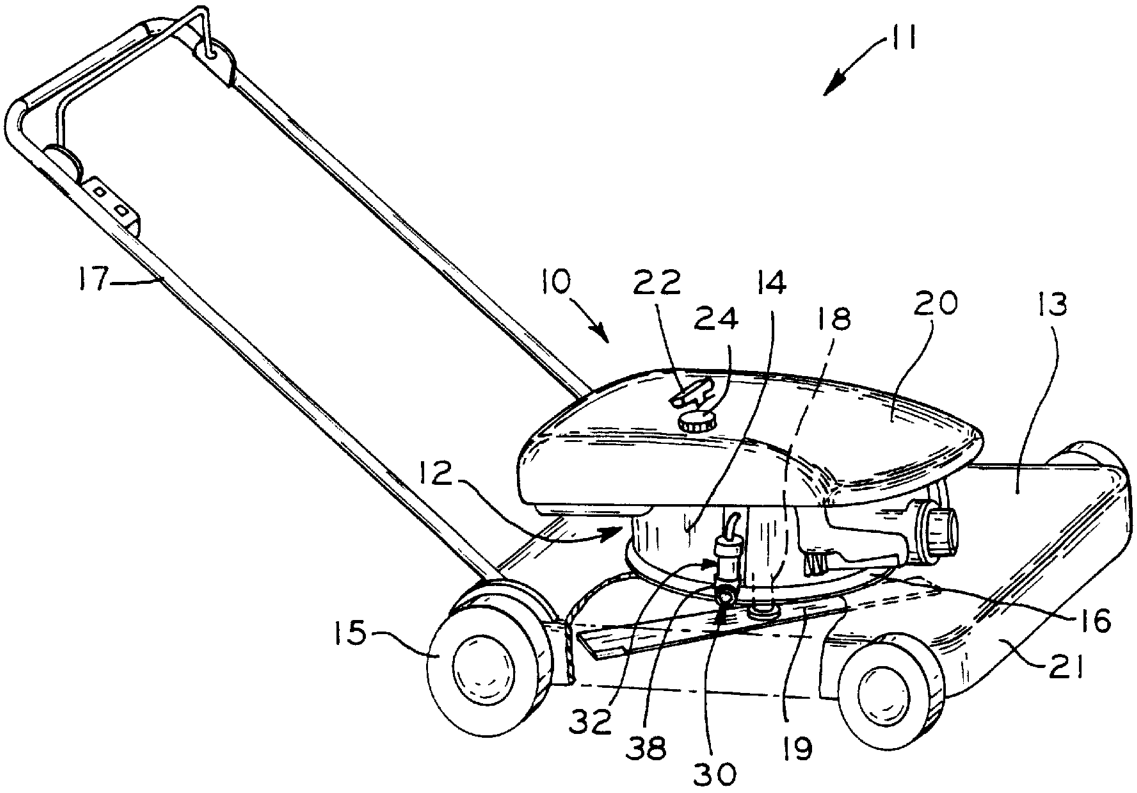
FIG. 1 is a perspective view of a lawnmower, showing the engine, an oil drain valve and an oil sight gauge in accordance with the present invention, and the mower deck partially cut away to show the crankshaft and the blade.

Referring to FIG. 1, an implement, for example lawnmower 11, is shown, including mower deck 13, wheels 15 rotatably mounted to deck 13, and an operator handle 17 connected to deck 13 in a conventional manner. However, the teachings herein may be used with implements other than lawnmower 11, such as a tiller or snow blower, for example. Engine 10 is disposed in housing 12, which includes crankcase 14 having mounting flange 16, which is attached to deck 13. Crankshaft 18 is driven by a piston-connecting rod assembly (not shown) disposed in engine 10. Crankshaft 18 extends exteriorly of housing 12 beneath deck 13, and is drivingly connected to cutting blade 19 in a conventional manner. Deck 13 includes skirt portion 21, which is shaped to enclose cutting blade 19 when lawnmower 11 is disposed on a ground surface.

Figure 2:
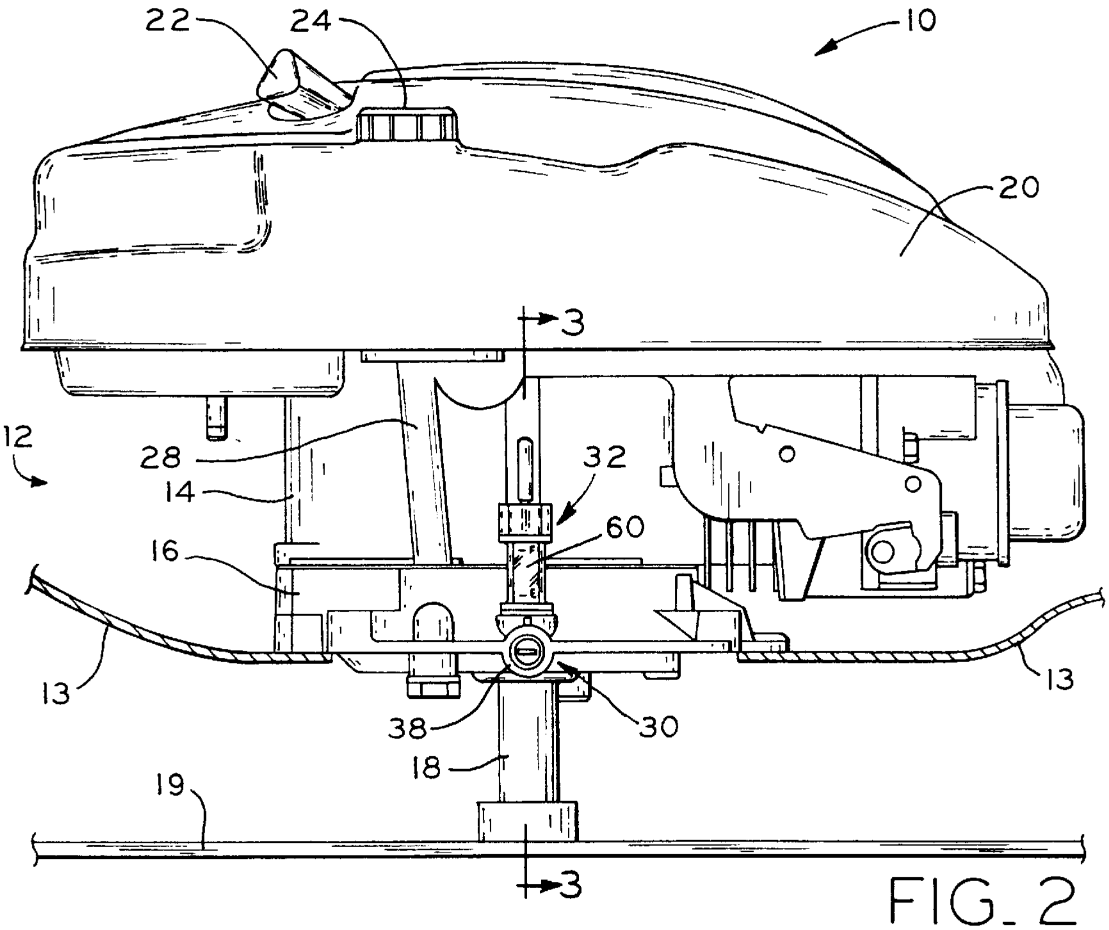
FIG. 2 is a side elevation of part of the lawnmower of FIG. 1, with the mower deck in section.

Referring to FIG. 2, housing 12 includes crankcase 14 with mounting flange 16. Mounting flange 16 is attached or secured to mower deck 13 in a conventional manner, such as by bolts (not shown). Engine 10 includes a piston-connecting rod-crankshaft assembly (not shown) as is conventional. Shroud 20 covers a flywheel (not shown) to direct cooling air around the various components of engine 10. Recoil starter handle 22 is pulled by an operator to rotate a recoil starter (not shown) to start engine 10. Oil fill cap 24 may be removed to allow pouring of oil into oil sump 26 (shown in FIG. 2), through oil fill tube 28. As shown in FIGS. 1 and 2, oil drain valve 30 and oil sight gauge 32 are mounted to mounting flange 16 and are visually associated with one another, as explained below.

Figure 3:
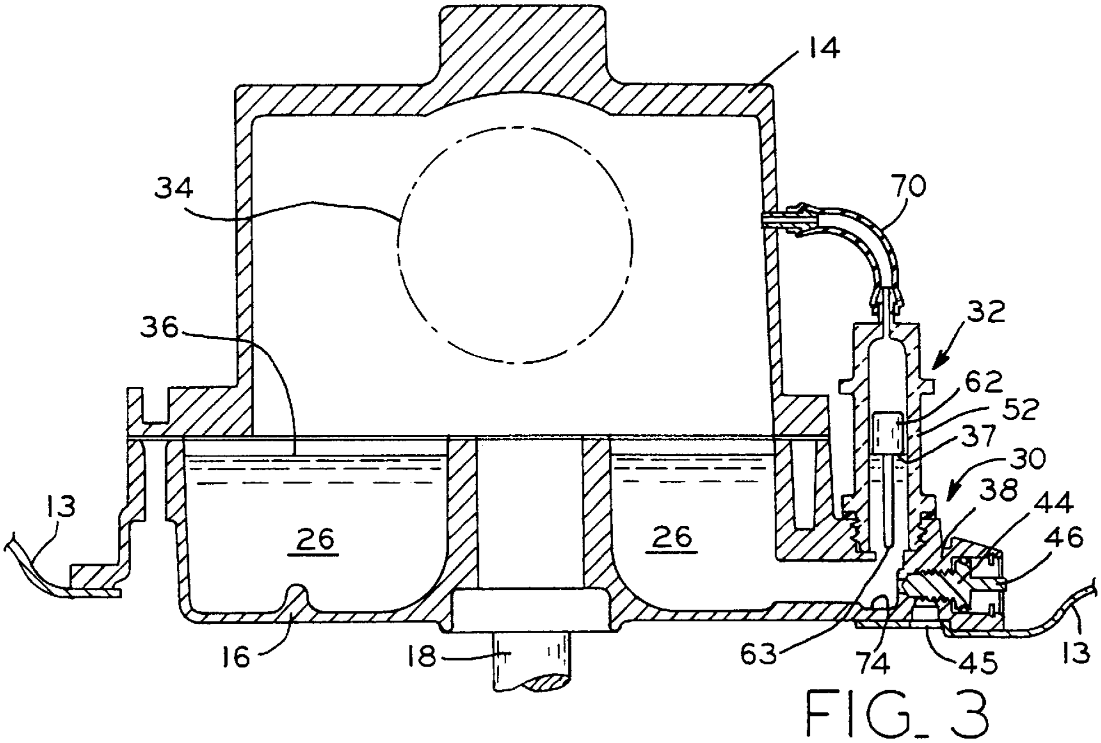
FIG. 3 is an enlarged sectional view taken along line 3—3 of FIG. 2.

Referring to FIG. 3, crankcase 14 includes cylinder bore 34, shown schematically in dashed lines, which receives a piston reciprocating therein, as is conventional. Mounting flange 16 is secured to deck 13, and carries oil sump 26 in a lower portion of crankcase 14, having crankcase oil level 36. Valve body 38 may be formed integral with mounting flange 16 as shown, or alternatively, may be press-fitted into mounting flange 16 as a separate component. Valve body 38 is shown in FIG. 3 disposed above deck 13, and includes drain opening 45 located below deck 13.

Figure 4:
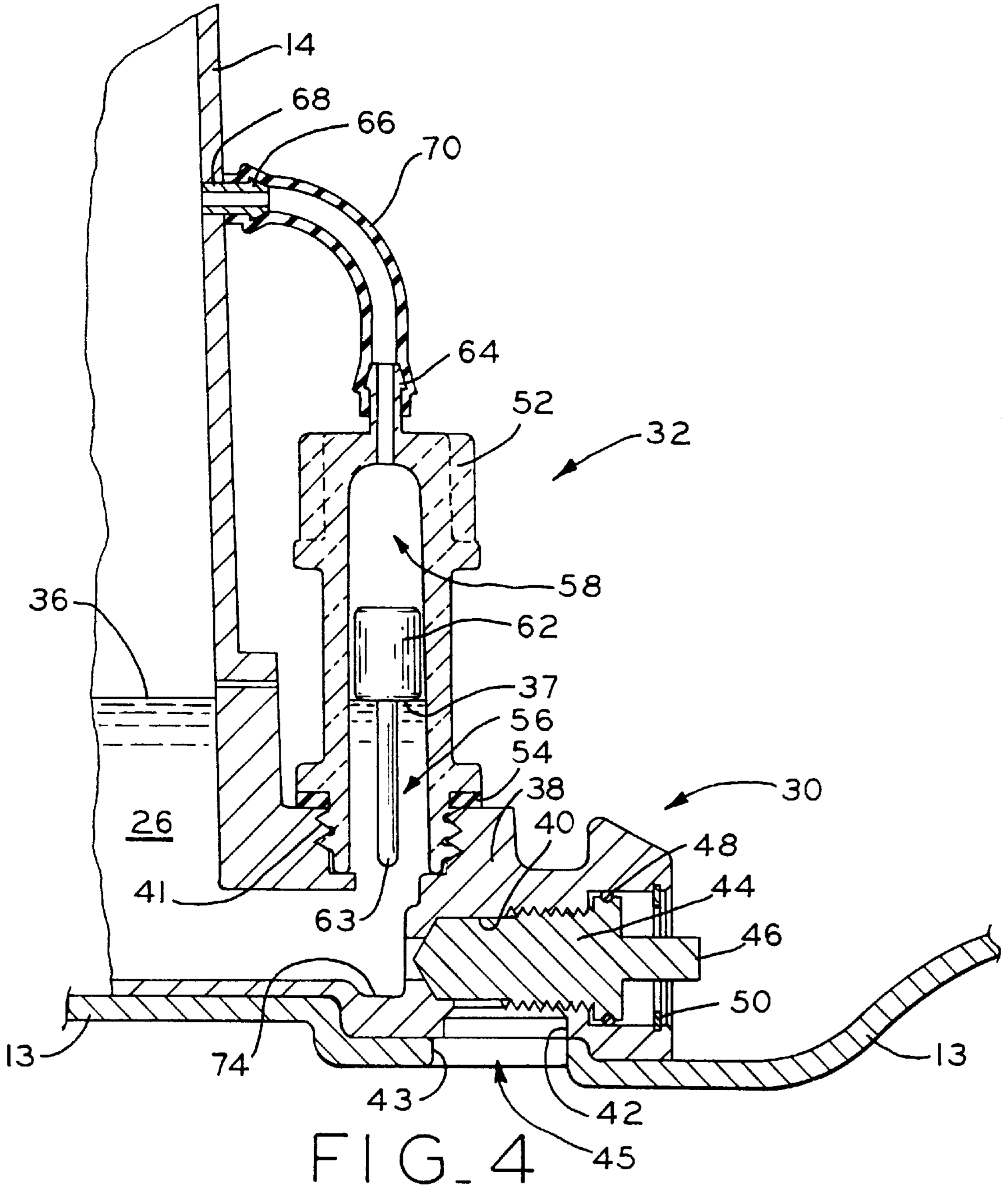
FIG. 4 is an enlarged fragmentary view of a portion of FIG. 3.

As shown in FIG. 4, oil drain valve 30 and oil sight gauge 32 are mounted to valve body 38, and each are in fluid communication with oil sump 26. As shown in FIG. 4, bore 40 in valve body 38 includes an elongated drain slot 42 formed in a side wall thereof which is aligned with drain aperture 43 in deck 13 to form drain opening 45. Valve member 44, shown as a stopcock threadedly received in bore 34, includes control element 46 connected thereto, which is shown as a handle. Control element 46 may be grasped by an operator to move valve member 44. Control element 46 may also be an internal slot in valve member 44, allowing valve member 44 to be actuated with a tool such as a screwdriver. Alternatively, valve member 44 may be slidingly received in bore 40. O-ring 48 is disposed around valve member 44, and provides a seal between valve member 44 and bore 40. Valve member 44 is retained within bore 40 by C-ring 50.

Oil sight gauge 32 includes oil sight tube 52 threadingly mounted in bore 41 in valve body 38. Gasket 54 is disposed between oil sight tube 52 and valve body 38, and provides a seal between oil sight tube 52 and valve body 38. Oil sight tube 52 is made of a transparent material, such as glass, or a clear or semi-clear thermoplastic material.

Alternatively, rather than oil sight gauge 32, a sight glass or sight crystal may be mounted in the wall of mounting flange 16 of crankcase 14, in communication with oil sump 26, to indicate whether oil is present in oil sump 26. For example, the sight glass or sight crystal may appear generally opaque when oil is present in oil sump 26 behind the sight glass or sight crystal, and may appear generally transparent when oil is not present in oil sump 26 behind the sight glass or sight crystal.

Oil sight tube 52 includes markings 60, shown in FIG. 2, which may indicate various oil levels ranging from maximum to minimum or empty to full, for example. Markings 60 may be etched or embossed on oil sight tube 52 or may be integrally molded with oil sight tube 52. Referring again to FIG. 4, indicator element 62, shown in FIGS. 3 and 4 as a float, floats on the oil within oil sight tube 52, and cooperates with markings 60 on oil sight tube 52 to indicate oil sight gauge oil level 37. Indicator element 62 includes extension member 63, which contacts bottom wall 74 of drain casting 38 of mounting flange 16 when the oil in oil sump 26 is at a minimum level or when the oil in oil sump 26 has been completely drained from oil sump 26, such that indicator element 62 indicates the same.

Oil sight tube 52 also includes first fitting 64, which may be integrally formed with oil sight tube 52. Second fitting 66 is press-fitted into aperture 68 in crankcase 14. Vent tube 70 is secured to first and second fittings 64, 66, and communicates, or internally vents, upper portion 58 of oil sight gauge 32 to crankcase 14, such that the air in upper portion 58 of oil sight gauge 32 is in communication with the air inside crankcase 14.

As may be seen in FIG. 4, because lower portion 56 of oil sight gauge 32 is in fluid communication with oil sump 26 and upper portion 58 of oil sight gauge 32 is internally vented to crankcase 14, pressure pulses created within crankcase 14 by the reciprocation of the piston-connecting rod-crankshaft assembly during running of the engine are equalized between crankcase 14 and oil sight gauge 32. Accordingly, crankcase oil level 36 is substantially horizontally coplanar with oil sight gauge oil level 37, both when the engine is running and when the engine is stopped. Therefore, oil sight gauge oil level 37 accurately indicates crankcase oil level 36, and indicator element 62 cooperates with markings 60 on oil sight tube 52 to provide a visual indication to an operator of crankcase oil level 36.

Figure 5A:
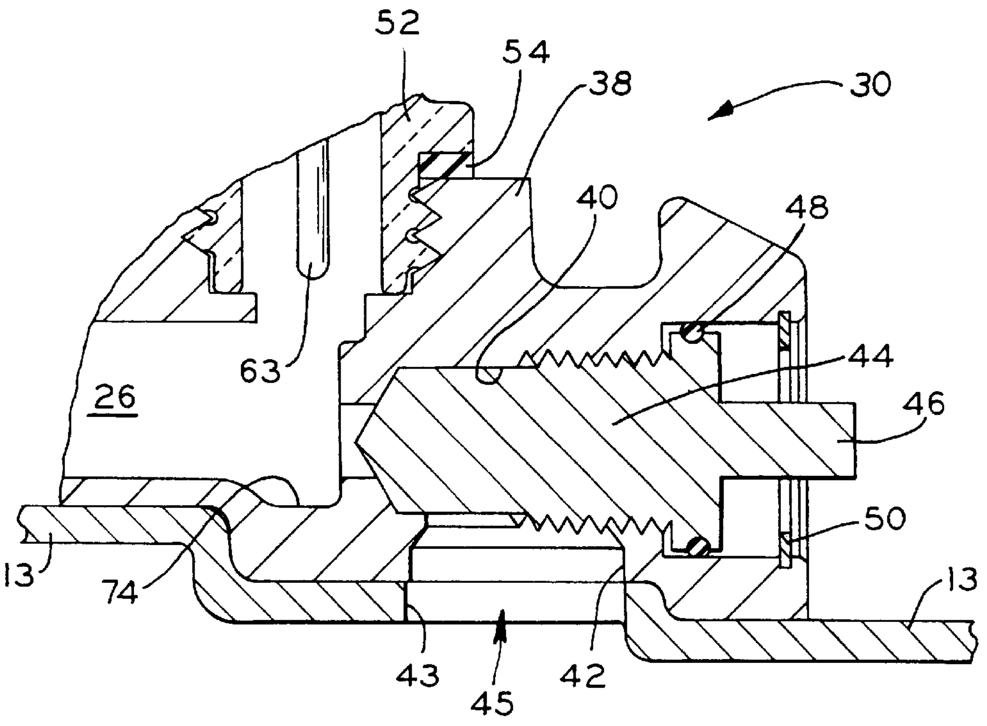
FIG. 5A is an enlarged fragmentary view of a portion of FIG. 4, showing the oil drain valve in a closed position.
Figure 5B:
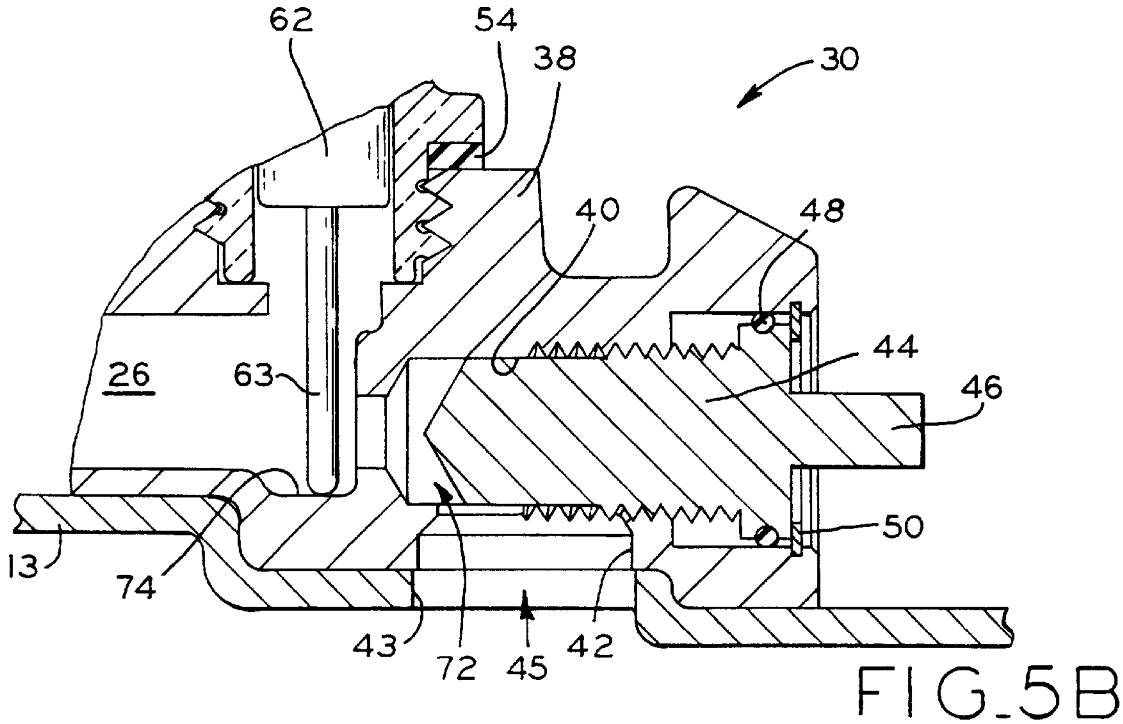
FIG. 5B is an enlarged fragmentary view of a portion of FIG. 4, showing the oil drain valve in an open position.

Referring to FIG. 5A, oil drain valve 30 is shown in a closed or first position, where valve member 44 is disposed in bore 40 such that valve member 44 blocks drain opening 45 to seal oil within oil sump 26. Control element 46 may be moved by hand to move valve member 44 to an open or second position within bore 40, as shown in FIG. 5B, in which valve member 44 is moved away from drain opening 45 such that oil may drain from oil sump 26 through drain passageway 72 and out of the engine through drain opening 45 below deck 13. In use, it might be necessary for an operator to remove grass clippings, dirt, or other debris from the area around drain opening 45 such that oil may drain therethrough before valve member 44 is moved to the open or second position shown in FIG. 5B. When all of the oil is drained from oil sump 26, as shown in FIG. 5B, extension member 63 of indicator element 62 will contact bottom wall 74 of drain casting 38 of mounting flange 16. When valve member 44 is in the position shown in FIG. 5B, valve member 44 abuts C-ring 50, which retains valve member 44 within bore 40 of valve body 38.

Referring again to FIGS. 2 and 4, it may be seen that oil sight gauge 32 is visually associated with oil drain valve 30, which herein means that oil sight gauge 32 and oil drain valve 30 are located with respect to one another such that when an operator opens oil drain valve 30, the operator may view a decreasing oil level in oil sump 26 as indicated by oil sight gauge 32. For example, as shown in FIGS. 1 and 3, oil sight gauge 32 is located proximal to, and disposed substantially vertically above, oil drain valve 30 to achieve visual association therebetween. However, other configurations of oil sight gauge 32 and oil drain valve 30 may be possible to provide visual association therebetween.

Drain opening 45 is located below deck 13 such that it is not necessary to tip engine 10 to drain all of the oil from crankcase 14. Drain opening 45 is not visible to the operator because drain opening 45 is located below deck 13, however, the operator may visually confirm that all of the oil has been drained from oil sump 26 by viewing oil sight gauge 32.

In addition, movement of valve member 44 to the position shown in FIG. 5B, together with an indication by oil sight gauge 32 that oil is not draining through drain opening 45, will signal the operator that drain opening 45 must first be cleared of debris before oil will drain from oil sump 26. Also, a stoppage of oil flow from oil drain valve 30 during draining, as indicated by oil sight gauge 32, will signal the operator that oil drain passageway 72 is clogged, or otherwise that oil remains in oil sump 26.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An implement, comprising:

a deck enclosing a blade;

an internal combustion engine attached to said deck and having a crankshaft drivably connected to said blade, said engine further having a crankcase, said crankcase including a mounting flange connected to said deck and carrying an oil sump in a lower portion of said crankcase; and an oil drain valve mounted to said crankcase, including a valve body integral with said mounting flange, an oil drain opening in communication with said oil sump and disposed below said deck, and a valve member disposed in said valve body and having a manually operable control element disposed above said deck, said valve member moveable between a first position in which said valve member blocks said oil drain opening and a second position in which oil may drain from said oil sump through said oil drain opening; and an oil sight gauge mounted to said crankcase, said oil sight gauge in fluid communication with said oil sump.

2. The implement of claim 1, wherein said oil sight gauge is mounted to said mounting flange proximal to said oil drain valve, and disposed substantially above said oil drain valve.

3. An implement, comprising:

a deck enclosing a blade;

an internal combustion engine attached to said deck, said engine having a crankcase, an oil sump disposed in a lower portion of said crankcase, and a crankshaft drivably connected to said blade;

an oil drain valve mounted to said crankcase, including a valve body, an oil drain opening in communication with said oil sump and disposed below said deck, and a valve member disposed in said valve body and having a manually operable control element disposed above said deck, said valve member moveable between a first position in which said valve member blocks said oil drain opening and a second position in which oil may drain from said oil sump through said oil drain opening; and an oil sight gauge mounted to said crankcase, said oil sight gauge in fluid communication with said oil sump, said oil sight gauge including a lower portion in fluid communication with said oil sump and an upper portion internally vented to said crankcase.

4. The implement of claim 3, wherein said upper portion of said oil sight gauge and said crankcase each include a fitting, said fittings connected by a vent tube.

5. An implement, comprising:

a deck enclosing a blade;

an internal combustion engine attached to said deck and having a crankshaft drivably connected to said blade, said engine further having a crankcase, said crankcase including a mounting flange connected to said deck and carrying an oil sump in a lower portion of said crankcase;

an oil drain valve mounted to said crankcase, including a valve body integral with said mounting flange, an oil drain opening in communication with said oil sump and disposed below said deck, and a valve member disposed in said valve body and having a manually operable control element disposed above said deck, said valve member moveable between a first position in which said valve members blocks said oil drain opening and a second position in which oil may drain from said oil sump through said oil drain opening; and an oil sight gauge mounted to said crankcase, said oil sight gauge in fluid communication with said oil sump, wherein said valve body includes a bore in said mounting flange, and said valve member comprises a stopcock threadedly disposed within said bore, said manually operable control element comprises a manually operable handle connected to said stopcock.

6. The implement of claim 5, wherein said drain opening is an elongated slot.

7. In a lawnmower having a deck enclosing a blade and an engine mounted to the deck, the engine having a crankcase with an oil sump disposed in a lower portion thereof and a crankshaft drivably connected to the blade, the combination of:

an oil drain valve mounted to the crankcase in fluid communication with the oil sump, said oil drain valve having a valve body, an oil drain opening disposed below the deck, and a valve member disposed in said valve body and having a manually operable control element disposed above the deck, said valve member selectively moveable between a first position in which said valve member blocks said oil drain opening and a second position in which oil may drain from the oil sump through said oil drain opening; and an oil sight gauge mounted to the crankcase in fluid communication with the oil sump, said oil sight gauge including a lower portion in fluid communication with the oil sump and an upper portion in venting communication with the crankcase.

8. A lawnmower, comprising:

a deck enclosing a blade;

an engine attached to said deck, said engine disposed in a housing including a crankcase having a mounting flange;

an internal combustion engine disposed in said housing;

a crankshaft driven by said engine, said crankshaft extending externally of said housing and drivably attached to said blade;

an oil sump carried in said mounting flange;

an oil sight gauge mounted to said mounting flange and having a lower portion in fluid communication with said oil sump and an upper portion in venting communication with said crankcase;

an oil drain valve in communication with said oil sump and mounted to said mounting flange, said oil drain valve including a valve body integral with said mounting flange, a drain slot disposed below said deck, and a valve member disposed in said valve body and having a manually operable control element disposed above said deck, said valve member moveable between a first position in which said valve member blocks said drain slot and a second position in which said valve member is moved away from said drain slot to allow oil to drain from said oil sump through said drain slot; and said oil drain valve and said oil sight gauge visually associated with one another.

9. The lawnmower of claim 8, wherein said oil sight gauge is mounted to said mounting flange proximal to said oil drain valve, said oil sight gauge disposed substantially above said oil drain valve.

10. The lawnmower of claim 8, wherein said upper portion of said oil sight and said crankcase each include a fitting, said fittings connected by a vent tube.

11. The lawnmower of claim 8, wherein said oil sight gauge includes a transparent oil sight tube, said oil sight tube threadedly mounted in a vertical bore in said mounting flange.

12. The lawnmower of claim 11, wherein said oil sight tube includes an indicator disposed therein, said indicator floating on the oil within said oil sight tube and cooperating with said marking to indicate an oil level within said oil sight tube.

13. The lawnmower of claim 8, wherein said valve body includes a bore, said valve member comprises a stopcock threadedly disposed in said bore, and said manually operable control element comprises a manually operable handle connected to said stopcock.

14. The lawnmower of claim 8, wherein said oil sight gauge is mounted to said mounting flange in visual association with said oil drain valve.

15. An implement, comprising:

a deck enclosing a blade, said deck having an opening;

an internal combustion engine attached to said deck, said engine having a crankcase, an oil sump disposed in a lower portion of said crankcase, and a crankshaft drivably connected to said blade;

an oil drain valve mounted to said crankcase, including a valve body, an oil drain opening in communication with said oil sump and with said deck opening, and a valve member disposed in said valve body and having a manually operable control element disposed above said deck, said valve member moveable between a first position in which said valve member blocks said oil drain opening and a second position in which oil may drain from said oil sump through said oil drain opening; and an oil sight gauge mounted to said crankcase, said oil sight gauge in fluid communication with said oil sump, wherein said crankcase includes a mounting flange connected to said deck and carrying said oil sump, said valve body integral with said mounting flange.

16. An implement, comprising:

a deck enclosing a blade, said deck having an opening;

an internal combustion engine attached to said deck, said engine having a crankcase, an oil sump disposed in a lower portion of said crankcase, and a crankshaft drivably connected to said blade;

an oil drain valve mounted to said crankcase, including a valve body, an oil drain opening in communication with said oil sump and with said deck opening, and a valve member disposed in said valve body and having a manually operable control element disposed above said deck, said valve member moveable between a first position in which said valve member blocks said oil drain opening and a second position in which oil may drain from said oil sump through said oil drain opening; and an oil sight gauge mounted to said crankcase, said oil sight gauge in fluid communication with said oil sump, wherein said oil sight gauge includes a lower portion in fluid communication with the oil sump and an upper portion in venting communication with the crankcase.

17. In a lawnmower having a deck enclosing a blade, the deck having an opening, and an engine mounted to the deck, the engine having a crankcase with an oil sump disposed in a lower portion thereof and a crankshaft drivably connected to the blade, the combination of:

an oil drain valve mounted to the crankcase in fluid communication with the oil sump, said oil drain valve having a valve body, an oil drain opening associated with the deck opening, and a valve member disposed in said valve body and having a manually operable control element disposed above the deck, said valve member selectively moveable between a first position in which said valve member blocks said oil drain opening and a second position in which oil may drain from the oil sump through said oil drain opening; and an oil sight gauge mounted to the crankcase in fluid communication with the oil sump, wherein said oil sight gauge includes a lower portion in fluid communication with the oil sump and an upper portion in venting communication with the crankcase.

18. An implement, comprising:

a deck enclosing a blade, said deck having an opening;

an internal combustion engine attached to said deck, said engine having a crankcase, an oil sump disposed in a lower portion of said crankcase, and a crankshaft drivably connected to said blade;

an oil drain valve mounted to said crankcase, including a valve body, an oil drain opening in communication with said oil sump and with said deck opening, and a valve member disposed in said valve body and having a manually operable control element disposed above said deck, said valve member moveable between a first position in which said valve member blocks said oil drain opening and a second position in which oil may drain from said oil sump through said oil drain opening; and an oil sight gauge mounted to said crankcase, said oil sight gauge in fluid communication with said oil sump, wherein said oil sight gauge is mounted to said crankcase in visual association with said oil drain valve.

19. In a lawnmower having a deck enclosing a blade, the deck having an opening, and an engine mounted to the deck, the engine having a crankcase with an oil sump disposed in a lower portion thereof and a crankshaft drivably connected to the blade, the combination of:

an oil drain valve mounted to the crankcase in fluid communication with the oil sump, said oil drain valve having a valve body, an oil drain opening associated with the deck opening, and a valve member disposed in said valve body and having a manually operable control element disposed above the deck, said valve member selectively moveable between a first position in which said valve member blocks said oil drain opening and a second position in which oil may drain from the oil sump through said oil drain opening; and an oil sight gauge mounted to the crankcase in fluid communication with the oil sump, wherein said oil sight gauge is mounted to said crankcase in visual association with said oil drain valve.

* * * * *